United States Patent Office 3,317,413
Patented May 2, 1967

3,317,413
CONTROL OF ALUMINA CONTENT DURING IGNEOUS ELECTROLYSIS
Jacques Chambran, Tarascon-sur-Ariege, Ariege, France, assignor to Pechiney Compagnie de Produits, Chimiques et Electrometallurgiques, Paris, France
Filed Sept. 23, 1963, Ser. No. 310,588
23 Claims. (Cl. 204—67)

The present invention relates to an improved process and apparatus for the manufacture of aluminum by ingenous electrolysis of alumina.

According to existing industrial practice, the igneous electrolysis of alumina is continued until there is produced, in the electrolysis tank, the anodic polarization effect which is accompanied by a sudden and considerable increase in the voltage of this tank which can rise from 4 to 40 volts and even higher. This effect is attributed to an excessive impoverishment of the electrolysis bath in alumina content, corresponding to a content by weight of the order of 1.5 percent. This polarization effect is ended by supplying alumina to the bath.

The practice referred to above has numerous disadvantages since it introduces significant delays in the electrical running of a whole series of tanks when the anodic effect described above occurs in one. The practice also results in a considerable increase in the consumption of fluorinated products, due particularly to their electrolysis at the instant of the anodic effect, as well as a decrease in the current output (Faraday output). In addition, the practice produces a disintegration of the lower surface of the anode, of which it causes an increase in consumption, etc. Furthermore, it is difficult to obtain a complete dissolving of the alumina which is introduced into the bath in order to compensate for the consumption under the electrolysis effect. Even when this introduction is carefully carried out, a part of this alumina can remain in suspension in the bath and then finally be deposited on the carbon cathode. This causes an increase in the voltage drop, which results in an increase in the current consumption of the tank, as well as in a local heating, this favoring the formation of aluminum carbide and a corresponding degradation of this cathode. Despite the well-known disadvantages of the anodic effects, it has nevertheless generally been considered hitherto that the appearance thereof at regular time intervals, generally not exceeding 24 hours, constitutes an indication of a normal operation of the tank.

The present invention has for its object a process and an apparatus which makes it possible partially or completely to eliminate the anodic effects of the alumina igneous electrolysis tanks, to avoid depositions of alumina on the cathodic surface of the tanks and to obtain a considerable gain in the specific energy consumption.

It is a further object of this invention to provide a system capable of obtaining improved stability as regards electrical running of the series of tanks, along with a substantial decrease of the consumption of the fluorinated products, it being possible for the economy achieved to reach 50 percent of the normal consumption; to obtain a correlative cleansing of the atmosphere in the workshops, a decrease in the consumption of anodes, an improvement in the life of the cathodes, and a practically automatic running of the electrolysis shop, with considerable decrease in labor costs.

These and other objects of this invention will appear hereinafter and for purposes of illustration, but not of limitation, specific embodiments of this invention are shown in the accompany drawings in which FIGURE 1 shows in diagrammatic section an arrangement in which the pilot anode is one of the anodes of a tank with prebaked anodes;

Figure 10:
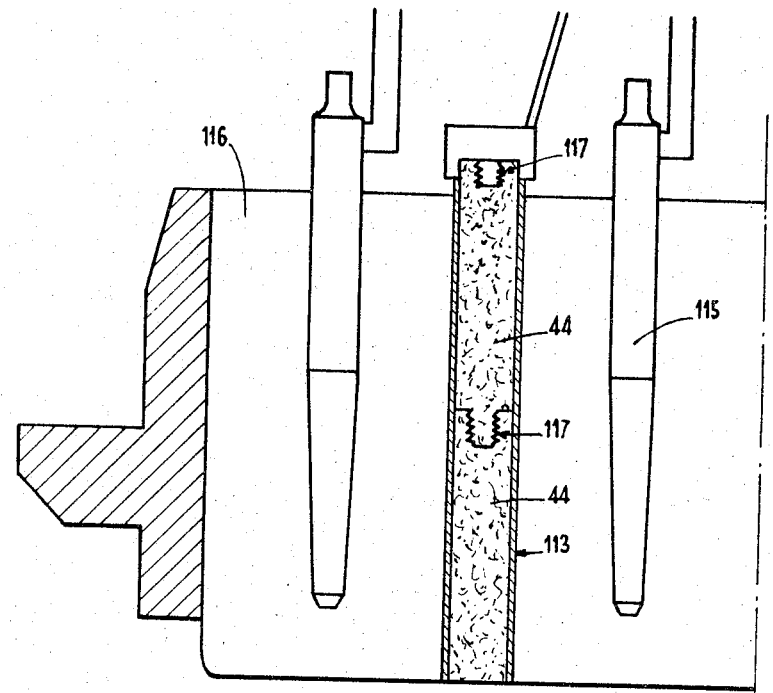
Figure 11:
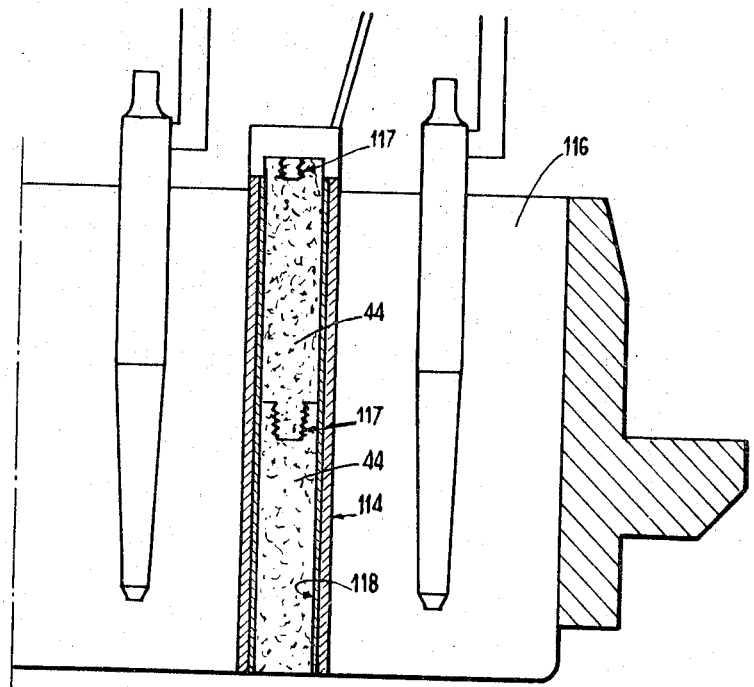
Figure 12:
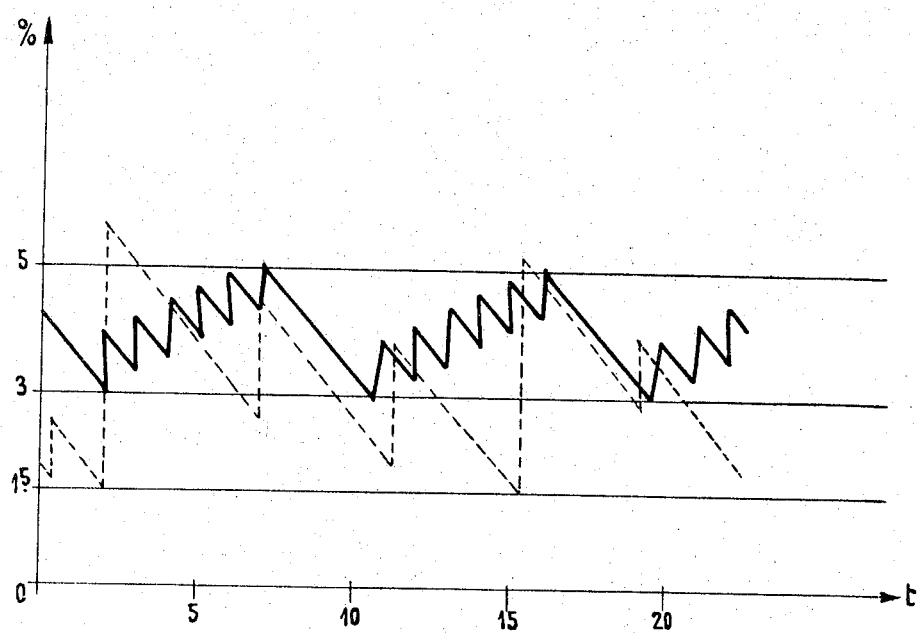

FIGURES 10 and 11 are diagrammatic vertical sections of two particular embodiments of a pilot anode incorporated in a Soederberg anode; and, FIGURE 12 shows in dotted lines a curve expressing the alumina content of the bath as a function of time in hours, the supply of alumina to the bath being carried out in accordance with known processes; it also represents in solid lines a curve expressing this alumina content as a function of time, the supply of alumina to the bath being effected in accordance with the embodiment of the invention which comprises the detection of a lower threshold and an upper threshold as regards alumina.

The system of this invention provides means for detecting the alumina content of an igneous electrolysis bath for the manufacture of aluminum, wherein the following steps are successively carried out:

(a) A current impulse is caused to pass through an anode known as a pilot anode, the base of which has a small surface in relation to the complete anode surface, so that the said base is traversed by a current having a density higher than the density $d$ of the current passing through the anode surface of the tank during normal operating conditions. This densisty is preferably maintained between 1.5 and 10 times the density $d$ and between 1 and 10 A./cm.$^2$, more particularly between 2 and 6 A./cm.$^2$.

(b) The voltage of the pilot anode is measured during the duration of the current impulse and this impulse is repeated systematically until the voltage of this pilot anode exceeds a value known as the excess voltage value, which is a value higher than the maximum value observed during the preceding impulses and preferably being between 1.05 and 2 times this value;

(c) By means of this excess voltage of the pilot anode, it is possible to detect the moment when the content of the dissolved alumina of the bath has dropped below a given threshold value (limit value) which depends on the selected impulse density.

With reference to the pilot anode, its "small surface in relation to the total anode surface," comprises a surface which in practice is smaller than 1/10 of the latter. It is evident that a larger surface could also be used for carrying out the process, but this would not be advantageous because of the necessity of increasing the intensity of the impulses if the surface of the pilot anode base is increased. The "total anode surface," comprises the whole of the substantially horizontal anode surface facing the cathode. The "anode voltage" comprises the potential difference in relation with the corresponding cathode.

The new process not only makes it possible to avoid the anodic effects of a cell and the disadvantages thereof, but it supplies in addition an indication of the proper functioning of the cells, which therefore makes it pointless in practice to make use of the anodic effect of the tank for this purpose.

According to a preferred embodiment of the invention, the pilot anode is permanently mechanically connected to the remainder of the anode system of its tank. It is separated electrically from this system during the period of carrying out each impulse passing therethrough and it is electrically reconnected to this system outside this time period. The distribution of the anode current of the tank is so chosen that the current density passing through the pilot anode outside the period of carrying out the current impulses is practically equal to that of the current passing through the remainder of the anode surface of the tank.

It is evident that the excess voltage value of the pilot anode described in the general definition of the invention as given above is chosen to be lower than the polarization voltages of this pilot anode for the impulse density which is used.

It has been found that the anodic polarization effect on the pilot anode occurs for alumina contents in the bath which are higher as the impulse density of the current through the pilot anode is stronger, this constituting one of the objects of the invention.

There is thus obtained, as advantages of the invention, a running of tanks in which the main alumina contents are increased, by a value of the order of one percent, in the mean value of the Faraday output of the in the mean alumina contents causes a decrease in the mean value of the counter-electromotive electrolysis force, and also an increase, which may exceed two percent, in the mean value of the Faraday output of the tanks. There is also obtained a slight decrease in the melting point of the bath, of the order of 3 to 4° C. for each percent by weight of alumina, this making possible a decrease of the same order in the working temperature of the tanks, which decrease is generally favorable, particularly from the point of view of the anode consumption.

According to another preferred feature of the invention, the level (the value) of the intensity of the direct current impulse source and, consequently, the value of the impulse density passing through the base of the pilot anode is chosen to correspond to the content threshold of dissolved alumina which is to be detected, or to the time of correlative anticipation. The term "anticipation time" corresponds to the time which elapses between the instant when the excess voltage of the pilot anode is apparent, and that time when the tank, which continues to become impoverished as regards alumina under the electrolysis effect, finally shows over its entire anode surface a polarization effect.

It is possible according to the invention to select the intensity of the direct current impulse source and, consequently, the density of the impulses passing through the pilot anode base so to correspond to a lower threshold of alumina content. This threshold is between approximately 2.5 percent and 5 percent by weight and more particularly of the order of 3 percent by weight. The bath is supplied with alumina when the pilot anode shows an excess voltage effect under the action of the said impulses.

According to another feature of the invention, the bath can be supplied with alumina, in accordance with the preceding paragraph, the quantity of this oxide corresponding approximately to a content by weight of the bath after dissolution of this alumina which is lower than 8 percent and preferably between 4 and 6 percent. It is thus possible for said content to be introduced in one or several operations.

According to one form of the invention, it is possible to accept from time to time, for example every ten days, an anodic polarization effect on the tank assembly.

According to the invention, the intensity level of the direct current impulse source and, consequently, the density of the impulses traversing the base of the pilot anode can be chosen so as to correspond to an upper threshold of alumina content which is a question of detecting, which threshold is between 4 and 6 percent approximately, and more particularly of the order of 5 percent by weight. The tank is supplied with alumina in portions, as the pilot anode produces an overvoltage phenomenon under the effect of the said impulses. The supply of alumina is stopped as soon as the pilot anode no longer shows the excess voltage phenomenon.

According to another feature of the invention, it is possible to select successively and alternatively two intensity levels for the impulse source of direct current passing through the pilot anode of a tank. The lower level of impulse intensity corresponds to the detection of a lower threshold of contents by weight of alumina in the bath of said tank which are between approximately 2 and 5 percent and more particularly of the order of 3 percent. The upper level of the impulse intensity corresponds to the detection of an upper threshold value of contents by weight of alumina in the bath of the same tank which are between approximately 4 and 6 percent, and more particularly of the order of 5 percent. When alumina contents lower than this lower threshold value are detected by means of the pilot anode, a quantity of alumina greater than the means alumina consumption of the cell per unit of time is introduced on average into the bath, per unit of time. This introduction is preferably carried out in small portions at relatively close time intervals, and it is continued until an alumina content exceeding the aforementioned upper threshold value is detected. At this instant, all supply of alumina to the bath is stopped until there is again detected smaller contents than the said lower threshold value. The supply cycle described above is then restarted. The process defined in this paragraph constitutes a particularly effective means for avoiding the occurrence of even slight depositions of alumina on the cathode surface of the tanks.

The time interval between two successive impulses can in practice be between two and 180 minutes according to the invention. It is possible to keep this time interval substantially constant throughout the duration of the whole series of current impulses or, for example, to decrease this interval during the development of this series.

The process according to the general definition of the invention as well as the particular embodiments thereof can be applied separately to each of the tanks of a group or to a series of tanks. By "group of tanks" is understood the assembly of several consecutive tanks forming part of a series of tanks. It is found that when the current impulses are effected on one of the tanks of a series of tanks, the intensity and the voltage of the other tanks are in practice not upset by the said detection operations.

It is possible according to the invention to measure the voltage of the pilot anode of a tank between the rod of this pilot anode and a cathode bar perpendicular to this pilot anode; however, it is generally more advantageous to measure the voltage of the pilot anode of a tank between the rod of the said pilot anode and the positive frame of the following tank.

It is possible according to the invention to obtain automatically the combination of the following operations:

Production of continuous current impulses at the intensity level corresponding to the detection of a lower threshold value as regards alumina content as described above;

Connection and disconnection of the electrical supply of the pilot anodes of the successive tanks of a group or of a series of tanks;

Measurement of the voltage of these pilot anodes subjected to the current impulses;

Initiation of a signal permitting of registering one tank and/or supplying alumina to one tank when its pilot anode shows an excess voltage effect.

According to another feature of the invention it is possible to carry out the successive and alternate production of direct current impulses at a lower intensity level and at a higher intensity level, as already described above. These lower and upper intensity levels of the impulses correspond to the detection of, respectively, a lower threshold and an upper threshold as regards the alumina content of the tanks by means of their pilot anodes. It is also possible to accomplish connection and disconnection of the electrical supply of the pilot anodes of the successive tanks of a group or the series of tanks, measurement of the voltage of these pilot anodes subjected to these current impulses, initiation of a first signal permitting the registration of a tank and/or supply of alumnia to a tank, when its alumina content falls below this lower threshold as regards alumina content, this supply being effected in small portions at close time intervals, initiation of another signal different from the first and permitting a tank to be recorded when its alumina content exceeds this upper threshold and/or to interrupt this supply when the alumina content of this tank exceeds this upper threshold.

According to one particular feature of the invention, it is possible within the scope of the process for automatically supplying alumina to the bath of a tank, in accordance with the preceding paragraph, to operate by horizontal displacements of the anode system of the tank. This aspect has been described in French Patent No. 1,228,309 filed on the 12th of March, 1959, and the result of these displacements is to break the crusts on the bath and to supply it with alumina.

Vertical displacements of this anode system are also contemplated. These vertical displacements can, according to the invention, have an amplitude of one to two cm. and they preferably entail a return to the starting point with their duration being, for instance, between 2 to 5 seconds. Preferably, the duration of the stop times which separate two successive displacements, one from another, is at least 20 times and preferably more than 200 times (greater than) the duration of one displacement, so that the mean overvoltage resulting from these displacements is practically negligible.

According to another feature of the invention, it is possible to carry out in combination, preferably in an automatic manner, the detection of the alumina contents of the tanks and their supply of alumina and also the adjustment of the interpolar distance of these tanks, based on the measurements of their internal resistance.

The measurements of the internal resistance of the tanks, which comprises the feature described in the preceding paragraph, can be carried out in accordance with French Patent No. 955,688, filed the 7th of April, 1944, or the improvements thereof, or by the combination of the following means whereby there is effected on the one hand the regulation to constant intensity of the whole of one series of tanks and, on the other hand, the measurement of the internal resistance of each tank, this being based on the single measurement of the voltage at the terminals of this tank. This latter combination, which makes it possible to simplify the automatic regulation of the interpolar spacing, has been made possible by the greater stability of electrical running of series of tanks supplied automatically with alumina by the system comprising pilot anodes according to the invention.

According to the invention, the source of direct current impulses can be independent of the direct current source which supplies the tank under normal running conditions. This independent source can consist of a battery of accumulators or of a current rectifier arrangement, or the like.

In a tank having prebaked anodes, it is possible according to the invention to select one of these anodes as pilot anode and a current source preferably in accordance with the feature described in the preceding paragraph as the direct current impulse source. It has been found that when an excess voltage, such as defined above, is produced under these conditions during a current impulse, the excess voltage value is reached almost instantaneously. This excess voltage is interrupted with suppression of the detection current. In accordance with the feature of the invention described in the present paragraph, it is usually not of any use to extend the duration of an impulse substantially beyond the moment when the current voltage reaches a stable value.

It is possible in accordance with one feature of the invention to use a pilot anode of which the base has a surface smaller than $\frac{1}{1000}$ and preferably smaller than $\frac{1}{5000}$ of the total anode surface. According to tests carried out by the applicant, it is generally favorable in this case to select a value smaller than 100 cm.$^2$ and preferably smaller than 20 cm.$^2$ as the area of the pilot anode base. This process makes it possible to use low impulse intensities which are generally below 25 A., so that the current impulse circuits can be achieved in a particularly economical manner. Such a pilot anode can be applied both to tanks with prebaked anode tanks and to tanks with self-baking anodes (Soederberg type).

It is possible according to the invention to select a pilot anode according to the feature described in the preceding paragraph and to supply this pilot anode during the current impulses by a circuit in shunt relative to the normal supply circuits of the tanks. Preferably, this shunt circuit is formed by the rod of the pilot anode of one tank forming part of a series of tanks being connected electrically during the impulse period with the positive frame of a preceding tank and more particularly of the immediately preceding tank. Instead of supplying the pilot anode during the current impulses through the positive frame of a preceding tank, it would also be possible to supply it by an independent source of direct current.

According to the invention, it is possible to apply in advantageous manner the previously described process to any embodiment of igneous electrolysis of an oxide or a metal salt which produces an anodic polarization effect.

FIGURES 1 to 5, 7 and 12 are concerned with particular embodiments of the invention in which the pilot anode is one of the anodes of a tank having prebaked anodes.

FIGURES 6 and 8 to 12 relate to other particular embodiments of the invention in which the pilot anode has a base section smaller than $\frac{1}{1000}$ and preferably smaller than $\frac{1}{5000}$ of the total anode area of the tank.

Figure 1:
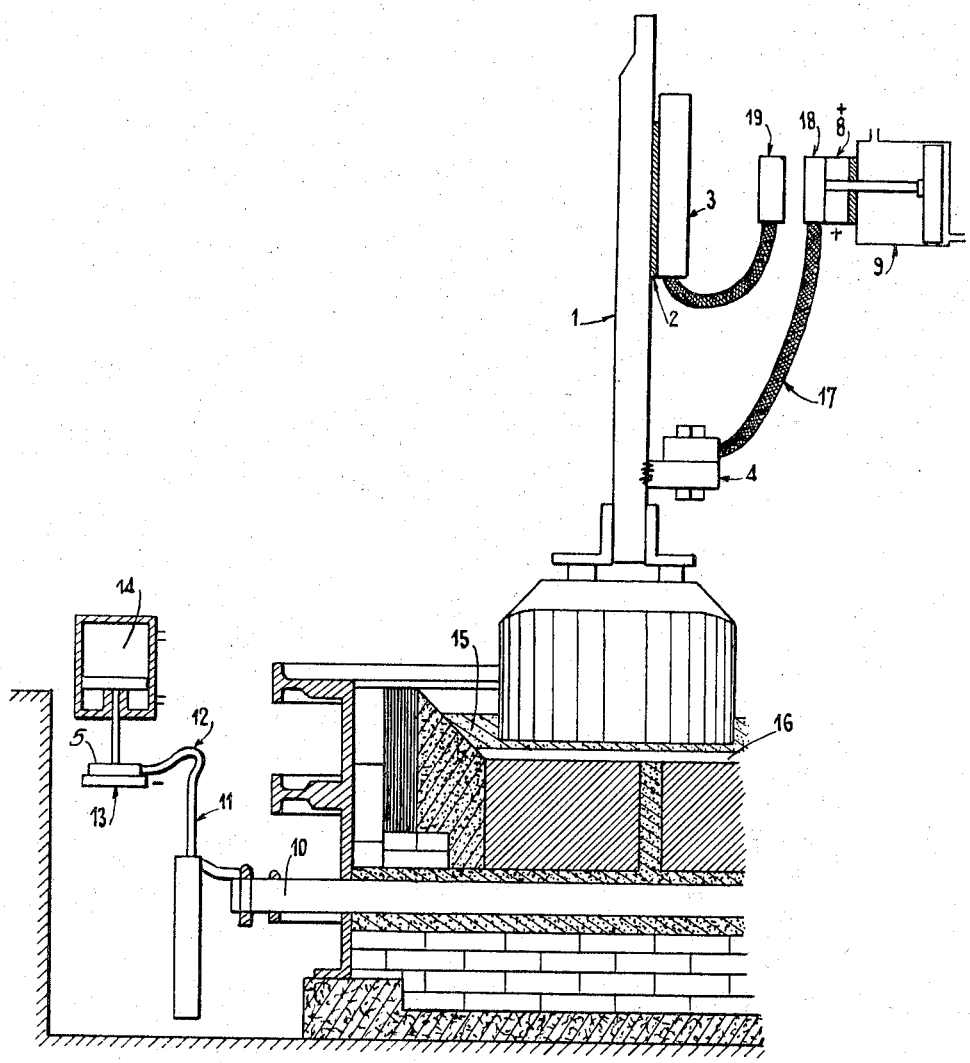

In FIGURE 1: 1 represents the pilot anode and its rod; 2 represents an insulating plate electrically separating the pilot anode from the anode frame 3. In the same way as the other anodes of the tank, the pilot anode is fixed to the frame 3 by a wedge and clip arrangement not shown in the figure; 4 indicates a current terminal welded to the pilot anode rod; 17 is a flexible conductor terminating at a contact plate 18, which latter can be brought into contact either with a contact plate 19 connected to the frame 3 by a flexible conductor, or with the bar 8 connected to the positive pole of a direct current impulse source. The displacements of the plate 18 are provided for by a jack 9; 10 represents a cathode bar of the electrolysis tank perpendicular to the pilot anode; 11 is a conductor connected to the bar 10; 12 is a flexible conductor connected to contact plate 5; 13 is a bar connected to the negative pole of the aforementioned auxiliary direct current source. An electrical connection can be made or broken between 5 and 13 by means of the screw jack 14; 15 indicates the electrolysis bath; 16 is the molten aluminum above the cathode.

FIGURE 1 shows the pilot anode at the instant when the latter is traversed by the current impulse.

When the current impulse has ended, the jack 9 brings the plates 18 and 19 into contact. The connection between the pilot anode and the positive pole of the detection current source connected to 8 is broken and that between the pilot anode and the anode frame 3 is re-established. At the same moment, the jack 14 breaks the electrical connection between the negative pole of the direct current impulse source (connected to 13) and the base bar 10. Consequently, outside the time of carrying out the current impulse, the pilot anode behaves exactly like the other anodes of the tank.

Figure 2:
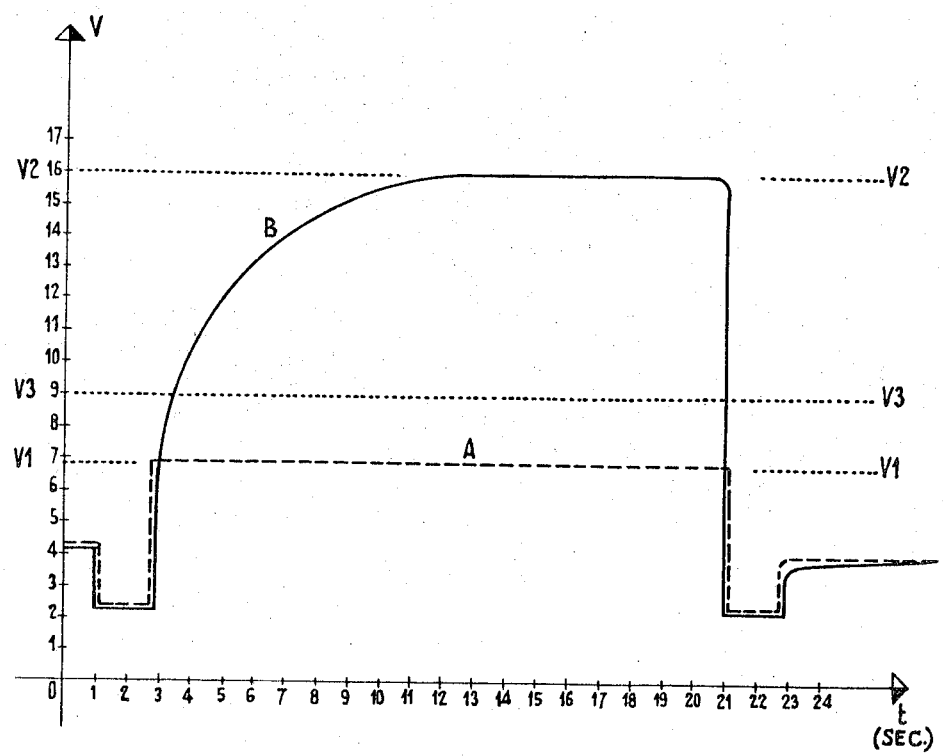
FIGURE 2 shows two curves indicating the voltage in volts of the current impulse as a function of time in seconds, and shows the development of impulses with or without polarization of the pilot anode.
Figure 3:
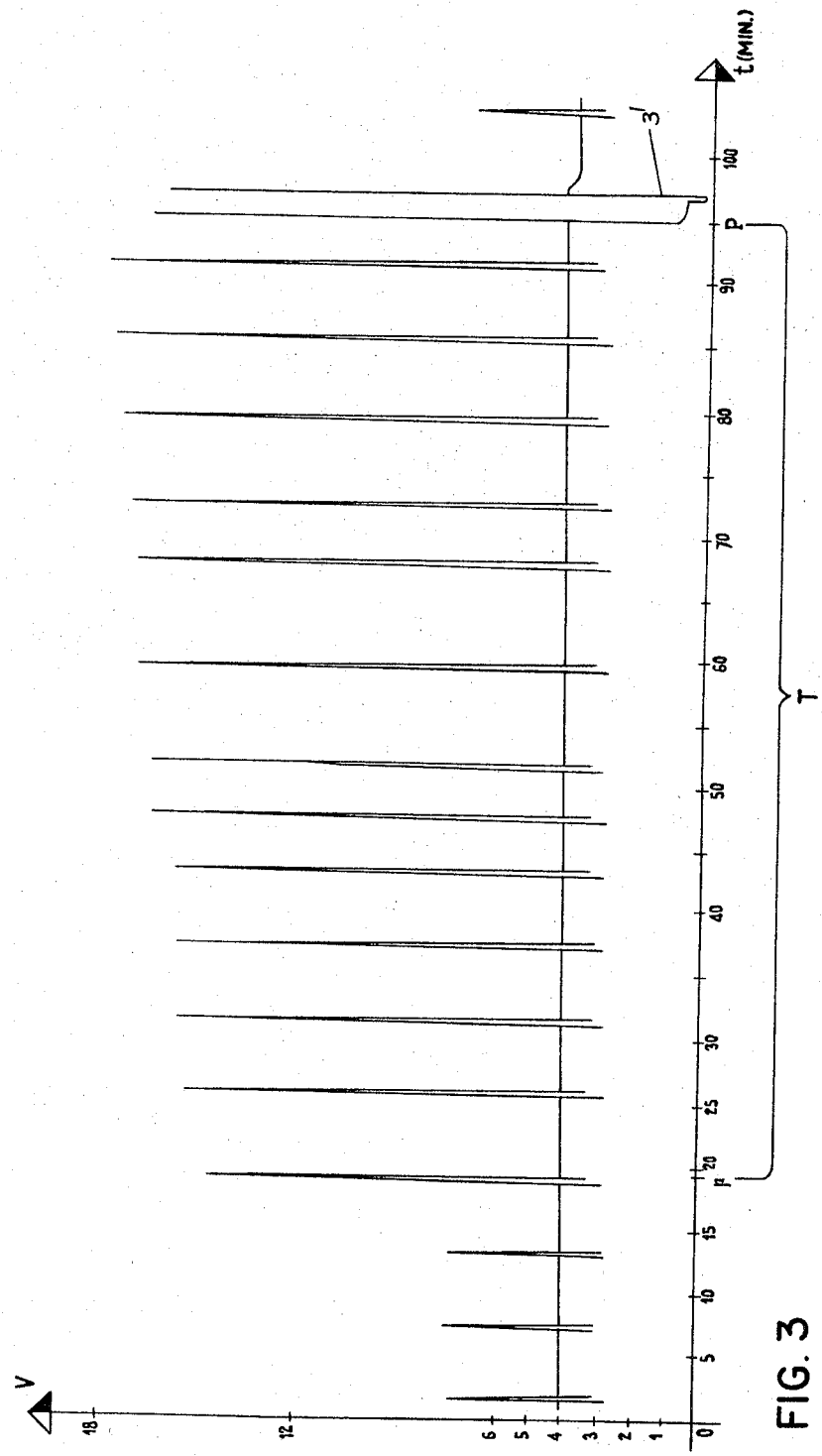
FIGURE 3 represents a graph expressing the tension in volts of the current impulse as a function of time in minutes and shows the development of the completion of a series of impulses.

As regards FIGURES 2 and 3 and also Examples 1 to 7, the voltage is measured between the conductor 11 and the current terminal 4 of the pilot anode. The illustrated intensities and voltages are also related to Examples 1 to 7, and cannot be considered as limiting.

In FIGURE 2, the curve A represents a current impulse without polarization of the pilot anode and the curve B an impulse with polarization of the said pilot anode. The voltage of the tank outside the time of carrying out current impulses is 4 volts. The voltage $v_1$ without polarization is 6.9 volts, and the voltage $v_2$ with polarization is 16 volts in equilibrium.

When the voltage reaches a value at least equal to the value $v_3$ known as excess voltage (this value is equal to 9 volts), the supply of alumina to the bath is undertaken. It is seen that the ascending portion of the curve B between the voltages $v_1$ and $v_3$ is described in approximately half a second and that the depolarization of the anode is instantaneous. The pilot anode then reassumes its normal running as soon as its connection to the normal circuit of the tank is made.

In FIGURE 3, the normal voltage of the tank is 4 volts. The first three current impulses which are shown correspond to an absence of polarization of the pilot anode, of which the first occurs at the instant $p$, correspond to pulse is about 7.6 volts. The following current impulses, of which the first occurs at the instant $p$, correspond to a polarization condition of the pilot anode of which the maximum voltage varies between 14.7 and 18.2 volts, in proportion as the series of current impulses is developed. The anodic polarization of the tank assembly starts at the instant P. The anticipation time T, that is to say, the time interval between $p$ and P is 75 minutes. The bath is supplied with alumina as soon as the anodic polarization of the tank is produced, after which the functioning voltage of the tank again becomes 4 volts. The appearance of the curve after the instant P is due to the release of a cut-out which breaks the circuit of the pilot anode in the event of strong excess voltages.

FIGURES 1 to 3 correspond to impulses of a duration of approximately 18 seconds, separated by time intervals of about 6 minutes.

Figure 4:
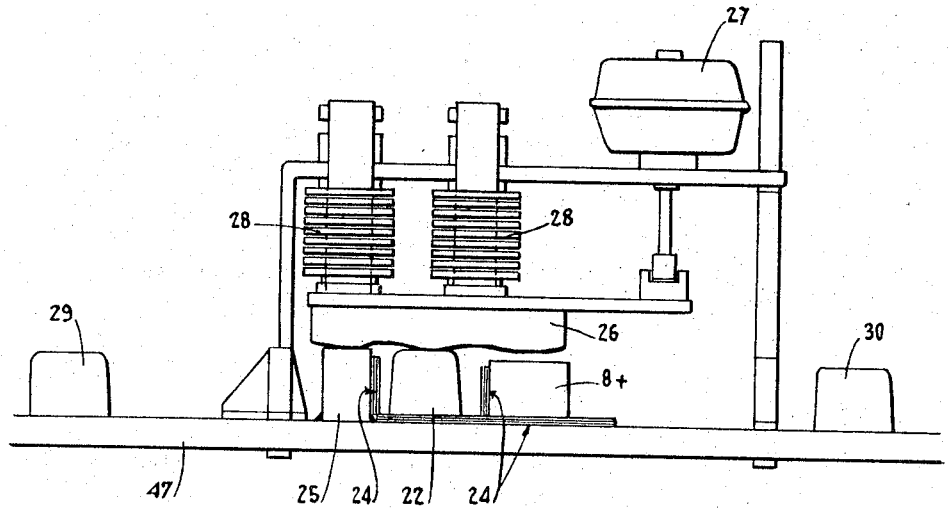
FIGURES 4 and 5 show two pneumatic switches for a pilot anode.
Figure 5:
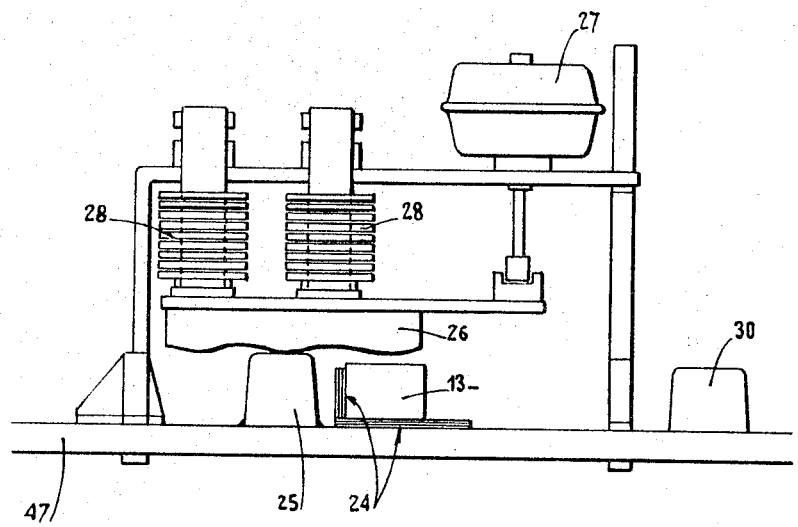

FIGURES 4 and 5 illustrate constructions which make it possible to carry out the connection and disconnection of a pilot anode capable of operating as an anode practically identical to the other anodes of the tank. These constructions comprise two pneumatic switches controlled simultaneously by the same valve (not shown in FIGURES 4 and 5) and fixed respectively to the positive frame 47 of two successive tanks (referred to as "upstream" and "downstream" tanks). They effect the electrical connection and disconnection of an anode of the upstream tank, interchangeable with respect to the other anodes of the tank. The rod of this anode is 22, 29 and 30 are the rods of anodes adjacent to the pilot anode, and the upstream switch (FIGURE 4) effects the electrical connection and disconnection of the pilot anode with the positive pole of the direct current source (the bar 8 is connected electrically to this pole) or with the positive frame of the upstream tank, by means of a rocking conductor bar 26 moved by a jack 27. The electrically insulating plates are 24, 25 is an abutment electrically connected to the positive frame of the upstream tank and 28 are springs working in compression. The downstream switch (FIGURE 5) opens or closes the circuit of the pilot anode by connecting or disconnecting the positive frame 47 of the downstream tank with the negative pole of the direct current impulse source (the bar 13 is electrically connected to this pole) by means of a rocking conductor bar 26 moved by a jack 27.

Figure 6:
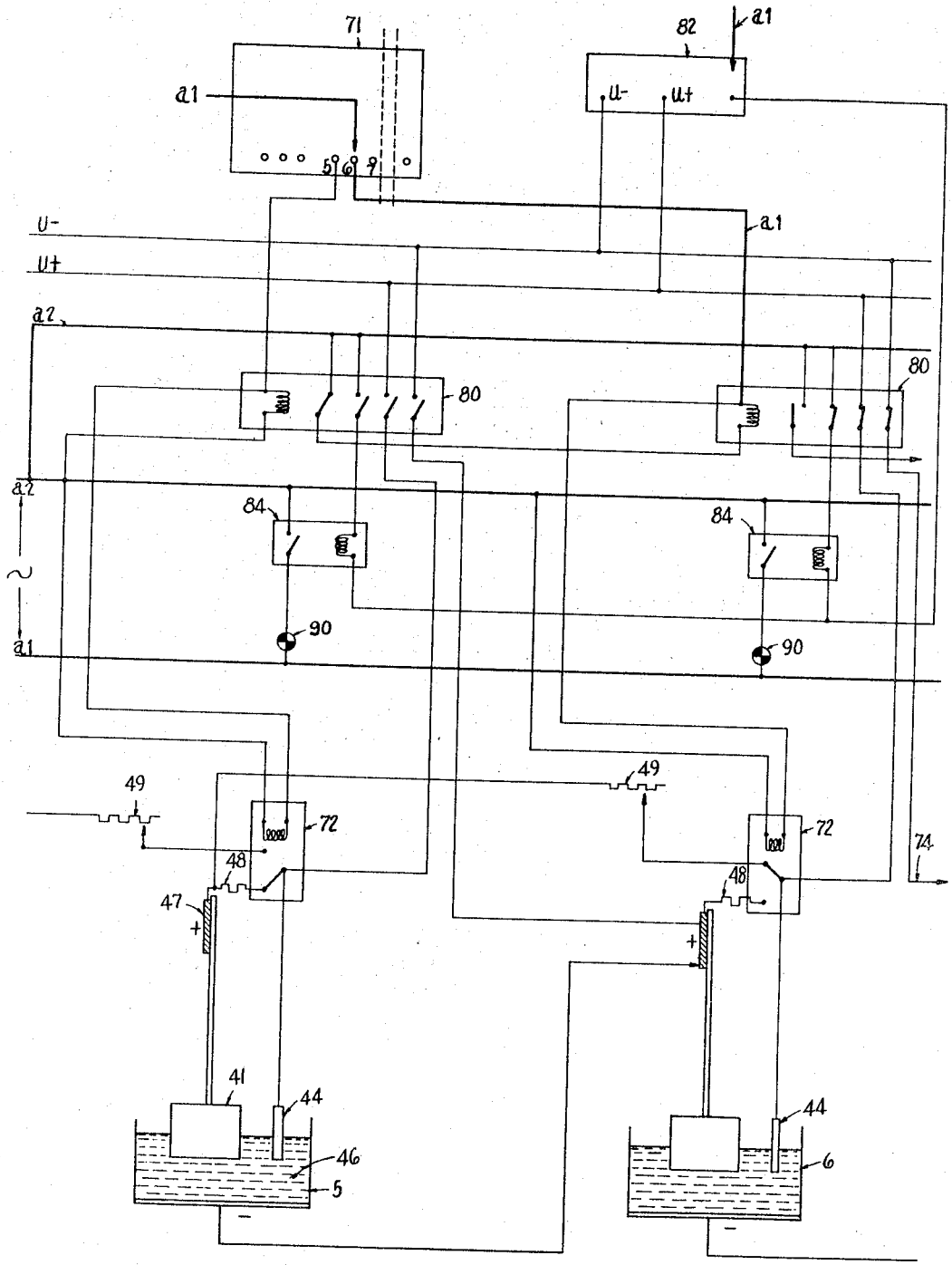
FIGURES 6 and 7 show circuit diagrams of two particular embodiments of the process.

FIGURE 6 relates to an arrangement comprising a tank forming part of a group or a series of tanks. The pilot anode 44 of each of these tanks of the group has a base area smaller than $\frac{1}{1000}$ and preferably smaller than $\frac{1}{5000}$ of the total anode area of its tank. The devices 72 (for example reversing switches) provide for connecting the pilot anode successively to the positive frame of their tank and to their current impulse circuit, the intensity level of which corresponds to the detection of a lower threshold as regards alumina content. Devices 80 (relay of selection or relays of selection chains) electrically connect the pilot anodes to their voltage-measuring circuit. A device 82 (voltage relay) provides for voltage measurement and is connected to a single pilot anode at the same time as the devices 80, per group of tanks. Devices 84 (signalling relays) are for initiating signals 90 (lamp) enabling a tank to be recorded when its pilot anode shows an excess voltage. A device 71 (such as a cyclic switch) simultaneously actuates the devices 72 and 80 of a tank, by sending an alternating current $a_1$, $a_2$ to these devices (71 operating successively for each of the tanks of the group of tanks). The voltage relay 82 controls the devices 84 and 90 by sending to them an alternating current $a_1$, $a_2$ when the voltage relay 82 measures an excess voltage in the impulse circuit of a pilot anode. U+ and U−, respectively, represent common conductors connecting the positive and negative poles of each pilot anode to the positive and negative poles of the voltage relays 82. 5 and 6 at the same time represent two successive terminals of the cyclic switch 71 and the two corresponding successive tanks of the series of tanks. The tank which follows the tank 6 is not shown, but the terminal 7 corresponding to the tank and the conductor 74 connected to the positive frame of this tank are shown. In order better to understand the diagram, a line indicating the supply paths of the alternating current $a_1$, $a_2$ is shown as a thickened line. For clarity of the diagrammatic FIGURE 6 (and also of the diagrammatic FIGURE 7), the pilot anode 44 is shown outside an anode 41 (or an anodic system 41) of the tank, but this does not prejudice the effective position of the anode 44 with respect to the anode 41.

The electric circuit between the rod of a pilot anode and the positive frame of the preceding tank can be provided with a variable resistance 49, enabling the current density of the pilot anode 44 to be regulated during the impulses at a level corresponding to the detection of a lower threshold value of the alumina content.

48 is an additional resistance such that the current density at the base of the pilot anode is practically the same as that of the current which is traversing, at the same moment, the anodic surface of the tank.

The current shunting which the tank 5 experiences in order to supply the impulses of the pilot anode 44 of the following tank 6 is practically negligible, so that this shunting has no influence on the normal development of the electrolysis in this tank.

Figure 7:
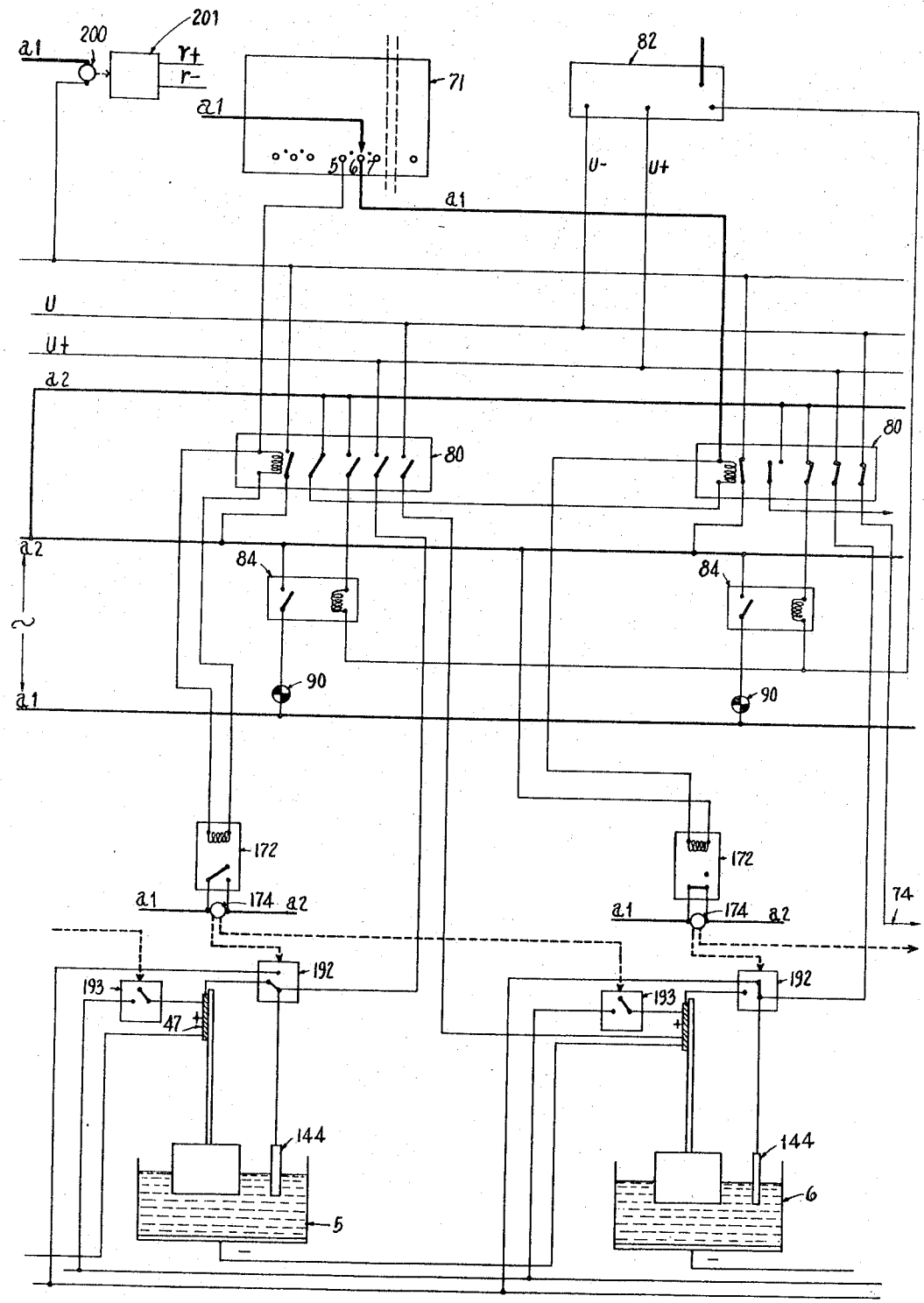

FIGURE 7 relates to an installation comprising a group of tanks forming part of a series of tanks and the pilot anode 144 of each of the tanks of the group, these tanks being of the type having prebaked anodes, of which one anode is used as pilot anode. Devices (relays) 172 are used for controlling valves (electromagnetic valves) 174. Pneumatic switches 192 and 193, both controlled by the electromagnetic valves 174, operate in accordance with the description of FIGURES 4 and 5. The switches 192 electrically connect the rod of the pilot anodes to the positive pole "$r^+$" of a direct current source (rectifier) 201. The switches 193 electrically connect the positive frame 47 of the tanks to the negative pole "$r^-$" of the source 201. A time-controlled relay chain 200 provides for connecting and disconnecting the rectifier 201 to its alternating supply circuit, the intensity level of the direct current produced by this rectifier 201 corresponding to the detection of a lower threshold value of the alumina content. Devices (selection relay or selection relays chain) 80 are provided for electrically connecting the pilot anodes to their voltage circuit. A device (voltage relay) 82 provides for this voltage measurement and devices (signalling relays) 84 initiate signals (lamp signals) 90 making it possible for a tank to be recorded when its pilot anode shows an excess voltage. A device 71 (such as a cyclic switch) simultaneously actuates the devices 172, 200 and 80 of a tank, supplying to these devices an alternating current $a_1$, $a_2$ (71 operating successively for each of the tanks of the group). The voltage relay 82 controls the devices 84 and 90 by sending to them an alternating current $a_1$, $a_2$ when this relay 82 measures an excess voltage in the impulse current of a pilot anode. The conductor 74 is connected to the positive frame of the tank 7 which follows the tank 6.

The electrical installations shown diagrammatically in FIGURES 6 and 7 are provided with safety circuits and devices which are known per se and which have not been shown in these figures.

Figure 8:
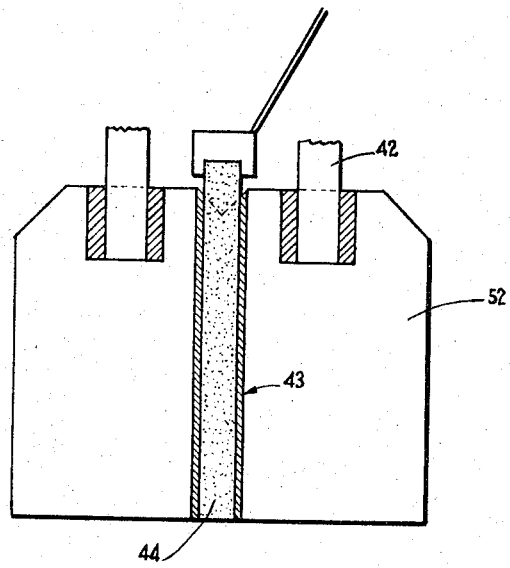
FIGURES 8 and 9 are, respectively, a diagrammatic vertical section and horizontal section showing one particular embodiment of the new pilot anode incorporated into a prebaked anode.

FIGURES 8 and 11 comprise a pilot anode 44 of carbon material, preferably graphite, which can comprise a cylindrical bar. This pilot anode, which is placed in a vertical cylindrical duct formed in the anode, is electrically insulated from the latter.

Figure 9:
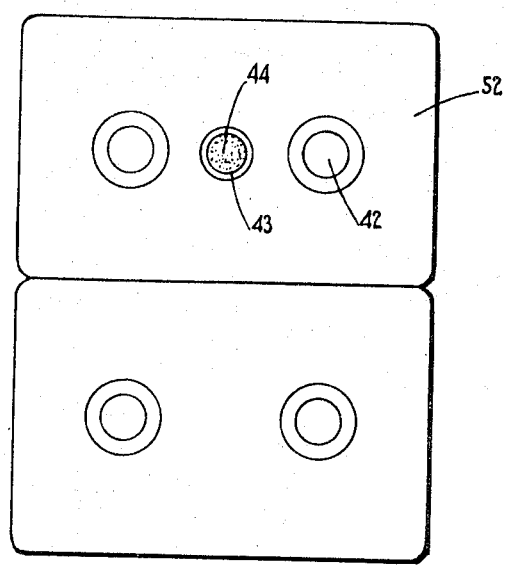

According to FIGURES 8 and 9, one of the anodes 52 of a tank equipped with prebaked anodes is drilled in order to position a pilot anode therein; the electrical insulation between the pilot anode 44 and the anode 55 is obtained by means of a tube 43 made of an insulating substance which is consumable in the bath, such as quartz or carundum. An anode lug is designated by 42.

According to FIGURES 10 and 11, the carbonaceous mass 116 of a Soederberg anode is passed through in order to position the pilot anode therein. The electrical insulation between the pilot anode 44 and the anode 116 is obtained by a means such as, for example, an adherent lining 113 of a refractory and insulating substance, for example alumina, or by an alumina layer 118 interposed between the pilot anode 44 and the metal tube 114 (for example iron) surrounding 44. Alternatively, a sheath or braid of asbestos impregnated with silicate may be employed. The adherent lining 113 can be formed by means of a metallizing blowpipe, under conditions which are known per se. The pilot anode can be made of successive elements assembled by nipple devices 117.

The invention also relates to constructions which enable the general process described above to be carried out as well as its various modifications. In non-limitative manner, this equipment can comprise various particular constructional forms. Certain of these forms have already been described above in the explanations given with respect to FIGURES 4, 5, 6, 7, and 8 to 11.

One further construction provides an automatic assembly of devices adapted for the successive and alternate production of direct current impulses at a lower intensity level and at a higher intensity level, as already described above. These lower and higher impulse intensity levels correspond to the detection, respectively, of a lower threshold and higher threshold as regards the alumina content of the tanks, by means of their pilot anode. The construction provides for connection and disconnection of the electrical supply to the pilot anodes of the successive tanks of a group or of a series of tanks, and for measurement of the voltage of these pilot anodes subjected to the current impulses. In addition, the construction enables initiation of a first signal enabling the recording of a tank when its alumina content falls below this lower threshold as regards alumina contents, and initiation of another signal, different from the first, permitting the recording of a tank when its alumina content exceeds this upper threshold. This assembly of devices comprises an equipment substantially in accordance with that described in connection with FIGURES 6 and 7, and also including means (for example, a multi-level adjustable transformer incorporated into the rectifier 201) for obtaining direct current impulses at a second intensity level higher than that described for FIGURES 6 and 7. In addition, there is provided means (for example a supplementary relay incorporated into the cyclic switch 71) for the control of the transformer referred to above, alternately and successively, to lower and upper intensity levels for the direct current supplied by the rectifier. Further automatic means effect initiation of a second signal, different from that described in respect of these figures, and permitting the recording of a tank of which the pilot anode is no longer showing the anodic polarization phenomenon under the effect of impulses at this second intensity level.

As already described above, it is possible to permit from time to time an anodic polarization effect for the assembly of one tank. When this phenomenon is produced, it is evident that it is necessary to supply alumina to this tank and that the process according to the invention comprises in this case not only the supply of alumina to the tanks according to the detection of the alumina contents by pilot anodes, but also the supply of alumina thereto in the event of anodic effect on the tanks themselves. This latter embodiment can for example be obtained by means of a supplementary voltage relay introduced into the equipment described in the preceding paragraph. This supplementary relay is engaged when the tank voltage exceeds a value known as the excess voltage value (corresponding to the anodic effect on the tank itself) and controls the automatic supply of alumina to this tank.

The following non-limitative examples complete the explanations already given in conjunction with the figures.

The following Examples 1 to 7 relate to an electrolysis tank belonging to a series of tanks and traversed by a current of 48,000 amps. This tank comprises 24 anodes, each of which has an area of about 2,700 cm.$^2$ at its base. A current of 2000 amps thus passes through each anode, providing at the base of the anode a current density $d$ of 0.741 A./cm.$^2$. One of these anodes has been equipped with a pilot anode according to FIGURE 1. The auxiliary source of direct current is a rectifier having a maximum power corresponding to 10,000 amps at 35 volts. The following Table I shows the main features of these seven examples. In this Table I, as well as in the Table II given later:

I indicates the intensity in amperes of the current impulse;

D the current density in amperes per cm.$^2$ at the base of the pilot anode during the passage of the current impulse;

$v_1$, $v_2$ and $v_3$ are the voltages already defined above;

T is the anticipation time in minutes;

Q is the amount by weight of $Al_2O_3$ in the bath at the instant of the excess voltage of the pilot anode.

TABLE I

| Ex. | I | D | D/d | $v_1$ | $v_2$ | $v_3$ | $v_3/v_1$ | T | Q |
|---|---|---|---|---|---|---|---|---|---|
| 1 | 3,000 | 1.11 | 1.5 | 4.8 | 8.2 | 6.8 | 1.42 | 5 | |
| 2 | 4,000 | 1.48 | 2.0 | 5.6 | 12.0 | 7.3 | 1.3 | 32 | |
| 3 | 5,000 | 1.85 | 2.5 | 6.0 | 12.8 | 7.3 | 1.22 | 60 | |
| 4 | 5,800 | 2.15 | 2.9 | 6.9 | 16.0 | 9.0 | 1.3 | 72 | |
| 5 | 6,000 | 2.22 | 3.0 | 7.6 | 18.2 | 9.1 | 1.2 | 76 | 3 |
| 6 | 6,800 | 2.52 | 3.4 | 8.2 | 21.5 | 9.1 | 1.1 | 105 | |
| 7 | 10,000 | 3.70 | 5.0 | 13.5 | 35.0 | 15.0 | 1.1 | 130 | 5 |

This table shows, inter alia, the relationship between T and $D/d$ already referred to.

Obviously, it is possible to combine two of the above examples and thus to detect successively and alternately, as already defined above, the alumina contents lower than a lower threshold value of 3 percent (Example 5) and those exceeding an upper threshold value of 5 percent (Example 7).

Examples 8 to 10 relate to an electrolysis tank belonging to a series of tanks through which a current of 56,000 amps, is passing. This tank comprises 28 prebaked anodes, each of which has an area of 2500 cm.$^2$ at its base. A current of 2000 amps thus passes through each anode, producing at the base of the anode a current density $d$ of 0.8 A./cm.$^2$. One of these anodes has been provided with a pilot anode according to FIGURES 6, 8 and 9; the cylindrical graphite rod constituting the pilot anode has a diameter of 23 mm., and a length of 500 mm. This rod is placed in a vertical cylindrical recess drilled in one of the pilot anodes of the tank and insulated from this latter anode by a quartz tube with a diameter of 23–30 mm. The drilling of the recess is quick and does not present and particular difficulty.

The additional resistance 48 is of 2.10 ohms. The resistance 49 is adjusted to 0.66 ohm for Example 7; 0.33 ohm for Example 8; 0.17 for Example 9.

The following Table II shows the main features of Examples 8 to 10 in connection with the pilot anode described above.

TABLE II

| Ex. | I | D | D/d | $v_1$ | $v_2$ | $v_3$ | $v_3/v_1$ | T | Q |
|---|---|---|---|---|---|---|---|---|---|
| 8 | 8 | 2.0 | 2.5 | 2.7 | 8.0 | 6.0 | 2.2 | | |
| 9 | 12 | 3.0 | 3.75 | 4.0 | 8.0 | 6.0 | 1.5 | 75 | 3 |
| 10 | 16 | 4.0 | 5.0 | 5.3 | 8.0 | 6.0 | 1.1 | 130 | |

It is obvious that any embodiment which makes use of the modifications of the new process or of the new equipment as described above, or means which are equivalent to practice, come within the scope of the present invention.

That which is claimed is:

1. In the process of controlling the alumina content of an igneous electrolysis bath during the manufacture of aluminum, the steps comprising providing a pilot anode, the base of said anode having a small area relative to the total anode surface in said bath, causing a current impulse to pass through said pilot anode, the current impulse being such that said base is traversed by a current having a density higher than the density $d$ of the current passing through the anode surface of the tank under normal operating conditions, said higher density being between 1.5 and 10 times the density $d$ and between 1.0 and 10 A./cm.$^2$, measuring the voltage of the pilot anode during the duration of this current impulse, repeating the impulse systematically until the voltage of the pilot anode exceeds an excess voltage which is higher than the maximum value observed during the preceding impulses, whereby the moment when the dissolved alumina content of the bath has dropped below a threshold value is detected, said threshold value depending on the chosen impulse density.

2. A process in accordance with claim 1 wherein the current impulse is between 2 and 6 A./cm.$^2$ and wherein said excess value is between 1.05 and 2 times said maximum value.

3. A process according to claim 1 wherein the pilot anode is mechanically fastened to the remainder of the anode system of its tank, this system being insulated electrically during the time of carrying out each impulse passing therethrough whereby the pilot anode is connected to this system except at this time, the distribution of the anode current of the tank being chosen so that the current density passing through this pilot anode outside the time of carrying out the impulses is practically identical with that of the current passing through the remainder of the anode surface of the tank.

4. A process according to claim 1 wherein the level of the intensity of the direct current impulse source, and consequently the value of the density of the impulses passing through the base of the pilot anode, are chosen to correspond to the threshold of the dissolved alumina content which is to be detected.

5. A process according to claim 1 wherein the intensity of the direct current impulse source, and consequently the density of the impulses passing through the base of the pilot anode, are chosen to correspond to a lower threshold value of the content by weight of alumina which it is a matter of detecting, said value being between about 2 and 5 percent, and the bath being supplied with alumina when the pilot anode shows an excess voltage phenomenon under the effect of said impulses.

6. A process according to claim 5 wherein the bath is supplied with alumina by means of a quantity of this oxide, corresponding approximately to a content by weight in the bath, after dissolving this alumina, lower than 8 percent by weight and preferably between 4 and 6 percent by weight.

7. A process according to claim 6 wherein the alumina is added in a plurality of batches.

8. A process according to claim 1 wherein the intensity level of the direct current impulse source and consequently the density of the impulses passing through the base of the pilot anode are chosen to correspond to an upper threshold of the alumina content by weight which it is a matter of detecting, which value is approximately between 4 and 6 percent, the bath being supplied with alumina in portions as long as the pilot anode produces an excess voltage phenomenon under the effect of the said impulses and this supply of alumina being stopped as soon as the pilot anode no longer shows the excess voltage phenomenon.

9. A process according to claim 1 wherein two intensity levels of the source of direct current impulses passing through the pilot anode of a tank are successively and alternately chosen, the lower impulse intensity level corresponding to the detection of a lower threshold value of the content by weight of alumina of the bath of this tank between approximately 2.5 percent and 5 percent, the upper impulse intensity level corresponding to the detection of an upper threshold value of the content by weight of alumina in this same bath between about 4 and 6 percent, introducing into the bath at the time when there are detected, by means of the pilot anode, alumina contents which are lower than said lower threshold value, a quantity of alumina higher than the mean consumption of alumina in the tank per unit of time, this introduction being carried out, in small portions, at relatively close time intervals, continuing the introduction until there is detected an alumina content exceeding said upper threshold value, stopping, at this instant, all supply of alumina to the bath until there is once again detected smaller contents than said lower threshold value, the supply cycle described above then being repeated.

10. A process according to claim 9 wherein the cycle is applied separately to each of the tanks of a group of tanks.

11. A process according to claim 10 wherein the voltage of the pilot anode of a tank is measured between the rod of this pilot anode and the positive frame of the following tank.

12. A process according to claim 11 wherein the combination of the following operations is carried out automatically: production of direct current impulses at an intensity level corresponding to the detection of a lower threshold value as regards the alumina content, connection and disconnection of the electrical supply of the pilot anodes of the successive tanks of a group of tanks, measurement of the voltage of these pilot anodes subjected to current impulses, and initiation of a signal permitting the recording of a tank when its pilot anode shows an excess voltage effect.

13. A process according to claim 12 wherein the following combination of operations is carried out automatically: production of direct current impulses at an intensity level corresponding to the detection of a low threshold value as regards alumina content, connection and disconnection of the electrical supply of the pilot anodes of the successive tanks of a group of tanks, measurement of the voltage of these pilot anodes, and supply of alumina to a tank when its pilot anode shows an excess voltage effect.

14. A process according to claim 11 wherein the combination of the following operations is carried out automatically: successive and alternate production of direct current impulses at a lower level and at a higher level of intensity, these lower and higher intensity levels of the impulses corresponding to the detection, respectively, of a lower threshold and a higher threshold as regards the alumina contents of the tanks by means of their pilot anode, connection and disconnection of the electrical supply of the pilot anodes of the successive tanks of a group of tanks, measurement of the voltage of these pilot anodes subjected to current impulses, initiation of a first signal permitting the recording of a tank when its alumina content falls below this lower threshold as regards alumina content, and initiation of another signal, different from the first, permitting the recording of a tank when its alumina content exceeds this upper threshold value.

15. A process according to claim 11 wherein the combination of the following operations is carried out automatically: successive and alternate production of direct current impulses at a lower level and at a higher level as regards intensity, these lower and higher intensity levels of the impulses corresponding to the detection, respectively, of a lower and upper threshold value as regards the alumina contents of the tanks, by means of their pilot anode, connection and disconnection of the electrical supply of the pilot anodes of the successive tanks of a group of tanks, measurement of the voltage of these pilot anodes subjected to the current impulses, supply of alumina to a tank when the alumina content of the tank falls below this lower threshold value, this supply being effected in small portions at relatively close time intervals, and interruption of this supply when the alumina content of this tank exceeds this upper threshold value.

16. A process according to claim 11 wherein the supply of alumina to the bath of a tank is carried out automatically by effecting horizontal displacements of the anodic system of the tank, the effect of these displacements being to break a crust of the bath and to thereby supply the bath with alumina.

17. A process in accordance with claim 11 wherein the supply of alumina to the bath of a tank is carried out automatically by effecting vertical displacements of the anodic system of the tank, the affect of these displacements being the breaking of the crust of the bath and to thereby supply the bath with alumina.

18. A process according to claim 11 wherein there is carried out, in combination and in an automatic manner, on the one hand, the detection of the alumina contents of the tanks and their supply with alumina and, on the other hand, the control of the interpolar distance of these tanks, based on the measurements of their internal resistance.

19. A process according to claim 18 wherein the measurements of the internal resistance of the tanks is carried out, on the one hand, by the regulation to constant intensity of a whole series of tanks and, on the other hand, by the measurement of the internal resistance of each tank of this series, this being based on the single measurement of the voltage at the terminals of this tank.

20. A process according to claim 1 wherein the source of direct current impulses is independent of the direct current source which supplies the tank under normal running conditions.

21. A process according to claim 1 wherein, in a tank having prebaked anodes, one of these anodes is chosen as pilot anode.

22. A process according to claim 1 wherein the base of the pilot anode has an area smaller than $\frac{1}{1000}$ and preferably smaller than $\frac{1}{5000}$ of the total anode area of the tank.

23. A process according to claim 22 wherein there is chosen a pilot anode which is supplied during the current impulses by a shunt circuit with respect to the normal supply circuit of the tanks, this shunt circuit being formed by electrically connecting, during the duration of the impulses, the rod of the pilot anode of one tank forming part of a series of tanks to the positive frame of the preceding tank.

References Cited by the Examiner

UNITED STATES PATENTS

| | | | |
|---|---|---|---|
| 2,933,440 | 4/1960 | Greenfield | 204—67 |
| 3,141,835 | 7/1964 | Rolin et al. | 204—195 X |
| 3,186,927 | 6/1965 | Mantovanello | 204—67 |
| 3,257,293 | 6/1966 | Chemla | 204—1 |

HOWARD S. WILLIAMS, *Primary Examiner.*

G. KAPLAN, *Assistant Examiner.*